United States Patent
Petersen et al.

(10) Patent No.: US 10,212,165 B1
(45) Date of Patent: Feb. 19, 2019

(54) SECURED VITAL SIGN DATA GROUP STREAMS

(71) Applicant: Vital Connect, Inc., Campbell, CA (US)

(72) Inventors: Steve Petersen, Los Gatos, CA (US); Kesava Mallela, Sunnyvale, CA (US)

(73) Assignee: VITAL CONNECT, INC., Tokyo (JP)

( * ) Notice: Subject to any disclaimer, the term of this patent is extended or adjusted under 35 U.S.C. 154(b) by 72 days.

(21) Appl. No.: 14/835,341

(22) Filed: Aug. 25, 2015

(51) Int. Cl.
  *H04L 29/06* (2006.01)
  *H04L 29/08* (2006.01)
  *G06F 17/30* (2006.01)

(52) U.S. Cl.
  CPC ...... *H04L 63/101* (2013.01); *G06F 17/30887* (2013.01); *H04L 65/4069* (2013.01); *H04L 67/02* (2013.01); *H04L 67/42* (2013.01)

(58) Field of Classification Search
  None
  See application file for complete search history.

(56) References Cited

U.S. PATENT DOCUMENTS

| | | | |
|---|---|---|---|
| 9,154,485 B1* | 10/2015 | Fallows | H04L 63/08 |
| 9,215,075 B1* | 12/2015 | Poltorak | H04L 63/04 |
| 2006/0288095 A1* | 12/2006 | Torok | G06Q 10/08 |
| | | | 709/223 |
| 2009/0058635 A1* | 3/2009 | LaLonde | A61N 1/37282 |
| | | | 340/539.11 |
| 2009/0131761 A1* | 5/2009 | Moroney, III | A61B 5/0002 |
| | | | 600/301 |
| 2009/0222539 A1* | 9/2009 | Lewis | G06F 19/3481 |
| | | | 709/221 |
| 2012/0242501 A1* | 9/2012 | Tran | A61B 5/0024 |
| | | | 340/870.02 |
| 2014/0266794 A1* | 9/2014 | Brown | A61B 5/0022 |
| | | | 340/870.16 |
| 2014/0288947 A1* | 9/2014 | Simpson | G06F 19/3418 |
| | | | 705/2 |
| 2015/0142475 A1* | 5/2015 | Rusin | H04L 67/12 |
| | | | 705/3 |
| 2015/0180920 A1* | 6/2015 | Hunter | H04L 67/025 |
| | | | 709/203 |
| 2015/0200817 A1* | 7/2015 | Mulchandani | H04L 67/1097 |
| | | | 709/223 |

(Continued)

*Primary Examiner* — Trang T Doan
(74) *Attorney, Agent, or Firm* — Brundidge & Stanger, P.C.

(57) ABSTRACT

A method and system for securely transmitting a plurality of data streams between a client device and a server that are in communication via standard Internet protocols are disclosed. The method comprises authenticating the client device by the server to create a Session ID and authorizing the client device to access the plurality of data streams by the server using at least one ACL Group, wherein a WebSocket connection is created between the client device and the server once the client device is both authenticated and authorized. The system comprises a client device and a server in communication with the client device via standard Internet protocols, wherein the server authenticates the client device to create a session, authorizes the client device to access the plurality of data streams using at least one ACL Group, wherein a WebSocket connection is created once the client device is both authenticated and authorized.

18 Claims, 6 Drawing Sheets

(56) References Cited

U.S. PATENT DOCUMENTS

| | | | | |
|---|---|---|---|---|
| 2015/0248525 A1* | 9/2015 | Ury | ............... | G06Q 50/24 |
| | | | | 705/3 |
| 2015/0276925 A1* | 10/2015 | Scholten | ............ | A61B 5/0002 |
| | | | | 702/150 |
| 2015/0370969 A1* | 12/2015 | Tambasco, Jr. | ........ | G16H 10/60 |
| | | | | 705/3 |
| 2016/0044071 A1* | 2/2016 | Sandholm | ............ | G06Q 10/101 |
| | | | | 709/204 |
| 2016/0058390 A1* | 3/2016 | Dyell | ................. | G06F 19/3418 |
| | | | | 340/870.07 |

\* cited by examiner

SECURED VITAL SIGN DATA GROUP STREAMS

FIELD OF THE INVENTION

The present invention relates to wearable sensor devices, and more particularly, to transmitting multiple streams of physiological data over an authenticated and secured connection.

BACKGROUND

The remote monitoring of physiological data or vital signs of an individual using wearable sensor devices must adhere to the privacy and security requirements of the federal Health Insurance Portability and Accountability Act (HIPAA). Therefore, the vital sign data must be transmitted over a secured connection from the source of the data (e.g., wearable sensor device that detects the vital sign data) to the receiver of the data (e.g., cloud server that stores and analyzes the vital sign data). HIPAA also requires that the receiver of the data to be authenticated and authorized to receive the data. Therefore, there is a strong need for a cost-effective and efficient solution that overcomes the aforementioned issues. The present invention addresses such a need.

SUMMARY OF THE INVENTION

A method and system for securely transmitting a plurality of data streams between a client device and a server that are in communication via standard Internet protocols are disclosed. In a first aspect, the method comprises authenticating the client device by the server to create a Session ID. The method further includes authorizing the client device to access the plurality of data streams by the server using at least one Access Control List (ACL) Group, wherein a WebSocket connection is created between the client device and the server once the client device is both authenticated and authorized.

In a second aspect, the system comprises a client device and a server in communication with the client device via standard Internet protocols, wherein the server authenticates the client device to create a session, authorizes the client device to access the plurality of data streams using at least one ACL Group, wherein a WebSocket connection is created once the client device is both authenticated and authorized.

BRIEF DESCRIPTION OF THE DRAWINGS

The accompanying figures illustrate several embodiments of the invention and, together with the description, serve to explain the principles of the invention. One of ordinary skill in the art readily recognizes that the embodiments illustrated in the figures are merely exemplary, and are not intended to limit the scope of the present invention.

DETAILED DESCRIPTION

The present invention relates to wearable sensor devices, and more particularly, to transmitting multiple streams of physiological data over an authenticated and secured connection. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Remote health monitoring requires compliance with the privacy and security requirements of HIPAA including authentication and authorization of a receiver to receive the data and the transmittance of the data over a secured connection. A method and system in accordance with the present invention has the advantage of monitoring a plurality of remote vital sign data streams and transmitting the plurality of remote vital sign data streams over the same secured, authenticated, and authorized connection. Therefore, multiple streams of vital sign data can be sent from a wearable sensor device (that detects the vital sign data) or from a server (that has already received the detected vital sign data) and to an authenticated receiver that is authorized to receive the multiple streams of vital sign data via a single secured network connection. This enables the remote monitoring to not only comply with HIPAA requirements but also to increase the performance and simplicity of the monitoring.

In one embodiment, an HTTP WebSocket connection is utilized as the basis of the secure connection to push data from a source device (e.g., wearable device, server) to a receiver device (e.g., another server, a web browser, and a mobile device). In this embodiment, a unique URL is created by the source device based on individual vital sign data streams that comprise a vital sign data group stream ("group stream"). The receiver device is authenticated via an HTTP REST command that establishes a session between the source device and the receiver device. A session identifier is then transmitted by the receiver device and verified by the source device in an application-layer protocol within the secured HTTP WebSocket connection. Once the authenticated HTTP WebSocket connection is established, the source device uses an access control list to ensure that the receiver device is authorized to receive vital sign data streams from each of the sources (or individual vital sign data streams) that comprise the group stream before sending any data over the secured HTTP WebSocket connection.

Figure 1:
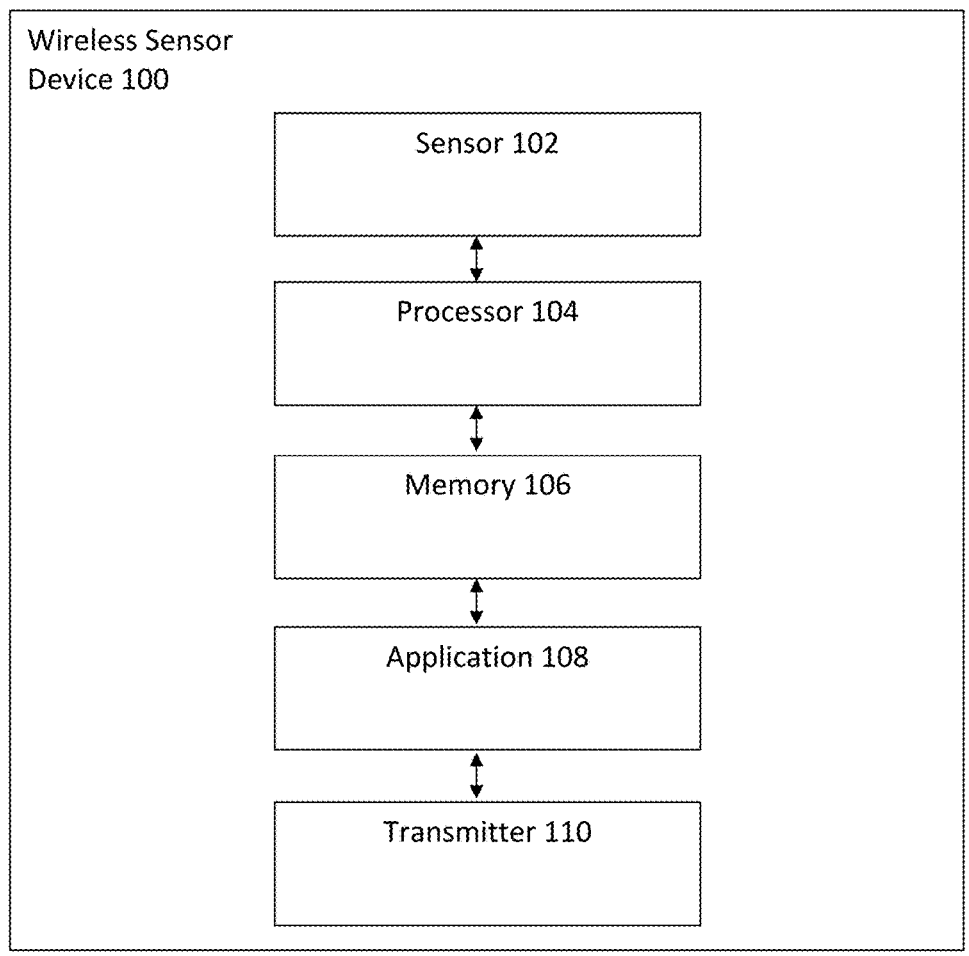
FIG. 1 illustrates a wireless sensor device for automatically determining vital sign data streams in accordance with an embodiment.

FIG. 1 illustrates a wireless sensor device 100 for automatically determining vital sign data streams in accordance with an embodiment. The wireless sensor device 100 ("wearable device") includes a sensor 102, a processor 104 coupled to the sensor 102, a memory 106 coupled to the processor 104, an application 108 coupled to the memory 106, and a transmitter 110 coupled to the application 108. One of ordinary skill in the art readily recognizes that the wireless sensor device 10 can include other components and that the components of the wireless sensor device 100 can be coupled in a variety of different ways and that would be within the spirit and scope of the present invention.

In one embodiment, the wireless sensor device 100 is attached to a user to detect various physiological signals via the sensor 102. The sensor 102 obtains the physiological signal data from the user, which is transmitted to the memory 106 and in turn to the application 108 via the processor 104. The processor 104 executes the application 108 to process and analyze the data to obtain health-related information. The information is transmitted to the transmitter 110 and in turn relayed to another user or device for further processing, analysis, and storage. In another embodiment, the transmitter 110 transmits the various detected physiological signals in raw form to a remote device/server (e.g., smartphone, cloud-based server, etc.) for further processing, analysis, and storage.

In one embodiment, the sensor 102 is any of a microelectromechanical system (MEMS) multi-axial (e.g., tri-axial) accelerometer and an embedded sensor with electrodes and the processor 104 is a microprocessor. One of ordinary skill in the art readily recognizes that a variety of devices can be utilized for the sensor 102, the processor 104, the memory 106, the application 108, and the transmitter 110 and that would be within the spirit and scope of the present invention.

Additionally, one of ordinary skill in the art readily recognizes that a variety of wireless sensor devices can be utilized including but not limited to wearable devices, a wireless sensor device in a patch form-factor, the Vital Connect Health Patch® wearable device, electrocardiograph devices, smart watches, tri-axial accelerometers, uni-axial accelerometers, bi-axial accelerometers, gyroscopes, and pressure sensors and that would be within the spirit and scope of the present invention.

In one embodiment, the HealthPatch® wearable device is a disposable adhesive patch biosensor worn on the chest that incorporates two surface electrodes with hydrogel on the bottom, a battery, an electronic module with an embedded processor and other electronic components and circuitry, a MEMS tri-axial accelerometer, and a Bluetooth Low Energy (BLE) transceiver.

In one embodiment, the wearable device facilitates continuous and automated monitoring of a plurality of physiological signals. In this embodiment, after the wearable device detects the plurality of physiological signals via a plurality of internal and embedded sensors, the electronic module of the wearable device utilizes a plurality of algorithms (e.g., firmware algorithms) to process raw waveforms of the plurality of physiological signals and to transmit a stream of the processed physiological variables via the BLE transceiver/link as encrypted data to a relay such as a smartphone, where the live (real-time) streams of data can be viewed, stored, and analyzed.

To describe the features of the present invention in more detail, refer now to the following description in conjunction with the accompanying Figures.

Figure 2:
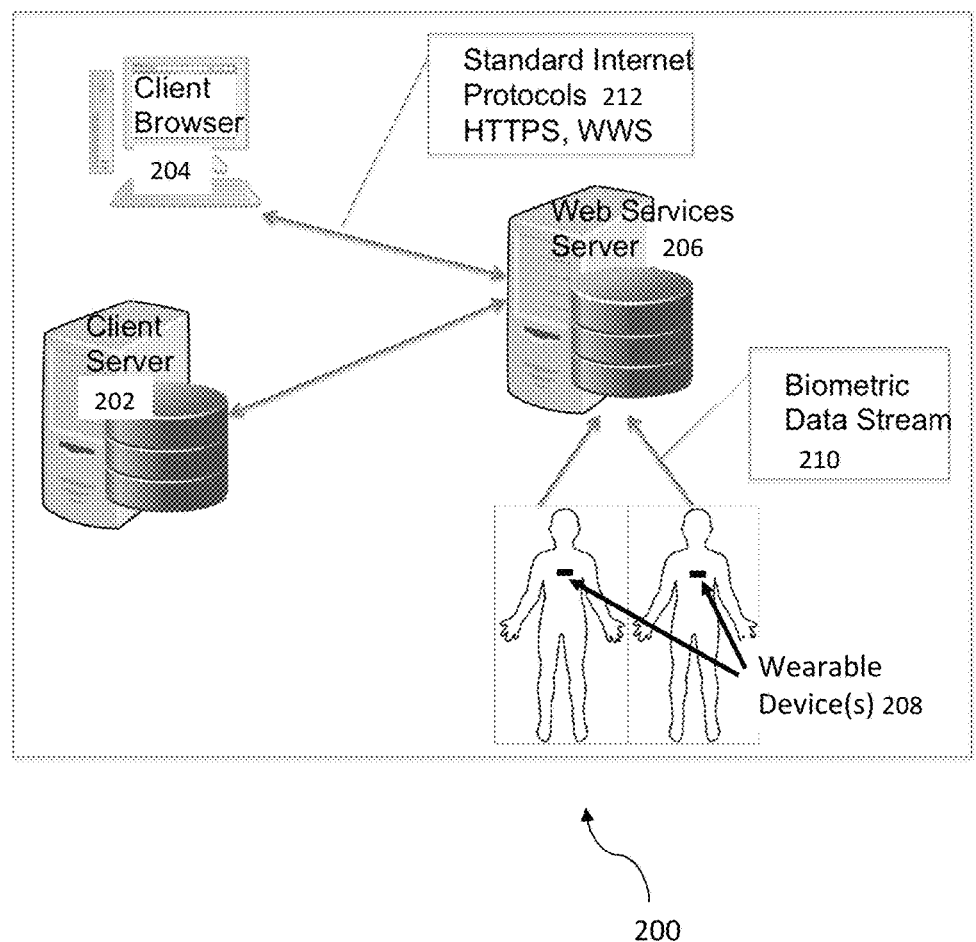
FIG. 2 illustrates a system for securely transmitting vital sign data group streams in accordance with an embodiment.

FIG. 2 illustrates a system 200 for securely transmitting vital sign data group streams in accordance with an embodiment. The system 200 includes a web services client that comprises any of a client server 202 and a client browser 204, a web services server 206 in communication with either the client server 202 and the client browser 204, and at least one wearable device 208 in communication with the web services server 206. The wearable device 208 detects biometric data 210 and transmits the biometric data 210 to the web services server 206. The system 200 utilizes standard Internet protocols 212 including but not limited to HTTPS (Hypertext Transfer Protocol Secure) and WSS (Web Socket Secure) to provide encrypted connection and data transfer. The standard Internet protocols 212 provide a first layer of security in the system 200.

In one embodiment, the client browser 204 includes but is not limited to another server, a computer device, a mobile device, and a web client running in an Internet browser such as Google Chrome or Apple Safari or another browser. In one embodiment, the biometric data 210 includes but is not limited to any of physiological signals, signals generated from the human body, heart rate, respiration rate, posture, steps, stress, and other health-related signals detected by the wearable device 208.

After the first layer of security, a second layer of security in the system 200 is provided via authentication. Authentication allows the web services server 206 to uniquely and securely establish the identity of the web services client (either the client server or the client browser 202-204). In one embodiment, the authentication mechanism includes but is not limited to any of HTTP basic authentication, digest authentication, OpenID authentication, and OAuth authentication.

Figure 3:
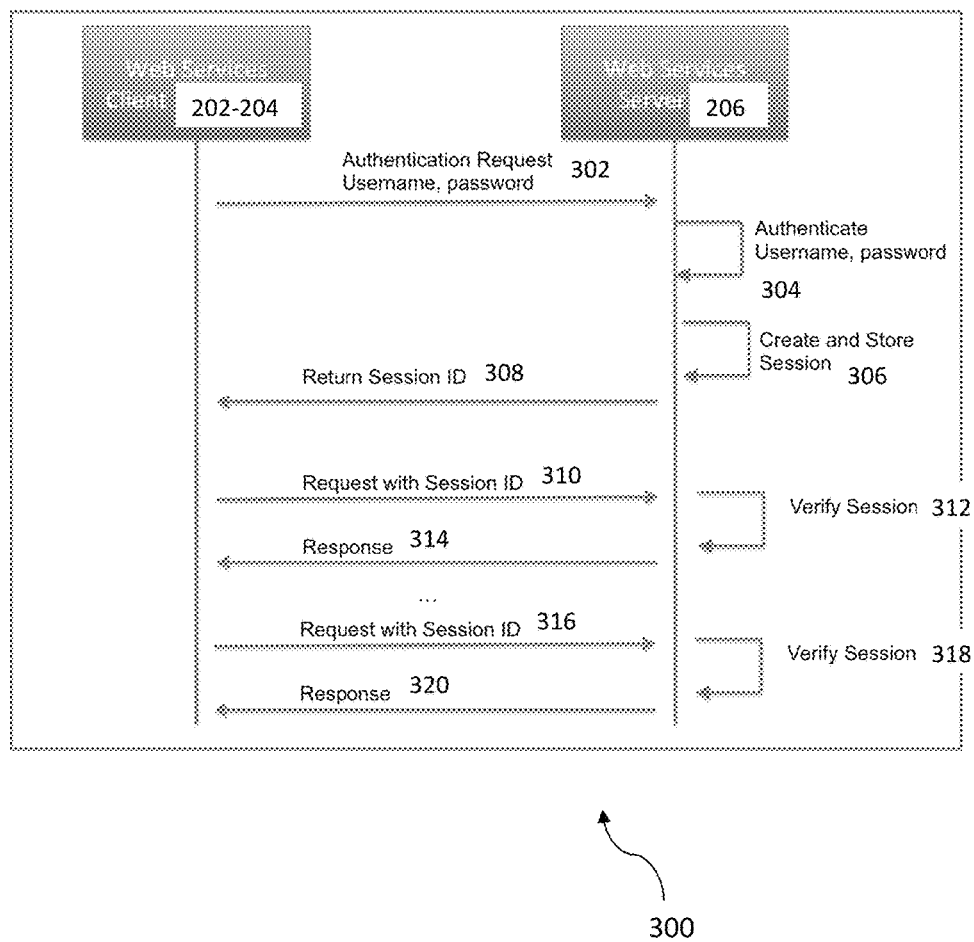
FIG. 3 illustrates a method for authenticating a web services client in accordance with an embodiment.

FIG. 3 illustrates a method 300 for authenticating a web services client in accordance with an embodiment. The method 300 involves a flow of communication and messages between the web services client and the web services server that ultimately creates a session between a web services client (similar to the client server 202 or the client browser 204 of system 200) and a web services server (similar to the web services server 206 of system 200) once the authentication is verified. The session is created for the system 200 to operate correctly and the session comprises a persistent record of identity and potentially other information established from the authentication provided by the method 300. In one embodiment, the session can be used on subsequent requests without having to re-authenticate.

In one embodiment, the method 300 comprises transmitting an authentication request from the web services client to the web services server, via step 302. In one embodiment, the authentication request includes information including but not limited to a username and a password. The web services server authenticates the received information, via step 304, and creates and stores the session with an associated Session ID, via step 306. In one embodiment, the session is stored in the web services server as a small data object. The Session ID is transmitted from the web services server to the web services client, via step 308. The steps 302-308 comprise an authentication phase of the method 300.

After the session is created and the Session ID is transmitted to the web services client (so both the web services server and web services client have the Session ID), the Session ID can be used on subsequent requests without having the web services client to re-authenticate with the web services server. For example, the web services client sends a subsequent request with the Session ID to the web services server, via step 310. The web services server verifies the Session ID, via step 312, and transmits a response to the web services client, via step 314. The steps 310-314 comprise subsequent connection requests and can be repeated (as shown by steps 316-320) a plurality of times between the web services client and web services server. In one embodiment, the web services client transmits the Session ID to the web services server by reference via a HTTP Cookie.

After the authentication (once the web services client has been authenticated in accordance with the method 300 of FIG. 3) or the second layer of security in the system 200, the web services server provides a process for granting or authorizing authenticated users access to specific/individual patient biometric data such as the biometric data stream 210 received by the web services server and from the wearable device attached to the patient for health monitoring. The authorization process serves as a third layer of security in the system 200. In one embodiment, the web services server utilizes an Access Control List (ACL) Groups mechanism or authorization process which is conceptually similar to the Unix file system permission attribute system. However, in this embodiment, the web services server additionally includes the ability to function with any authorization scheme that provides for explicit access for authenticated users (web services clients) to access specific/individual patient biometric data.

In one embodiment, an ACL Group is provided to enable a web services client (e.g. either client server or client browser) that is in communication with the web services server to perform an operation that has a specific permission, including but not limited to reading patient biometric data detected by a wearable device attached to the patient. In one embodiment, the ACL Group is an ACL Group 300 that includes a member list comprising any of a client user id, a permission description, and a resource name that is either explicitly defined or covered by a wildcard.

In one embodiment, the ACL Group 300 further comprises a property name, a description for each property name, and a default value for each property name. In one embodiment, the property names of the ACL Group 300 include but are not limited to any of a friendly name, a namespace, an API key, members, resources, an ACL value, and a Root_Group. In one embodiment, the "friendly name" property name is unique per API key and is an alpha-numeric string with no spaces or special characters. In one embodiment, the "namespace" property name has a default value of "/". In one embodiment, the "API key" property name has a default value that is set implicitly based on the user's session. In one embodiment, the "members" property name is an array of users (e.g. web services clients that have been authenticated by the web services server) identified by their OpenID identifiers that are members of the ACL Group 300.

In one embodiment, the "resources" property name is a list of resources that the ACL Group 300 has the authorization to manage and include but are not limited to resources such as Sensor Data Source globally unique identifiers (GUIDs), ACL Group 300 friendly names, IDs, and namespaces. In one embodiment, the "ACL value" property name is the access control field that is a bit-field value that specifics the permissions that group members in the ACL Group 300 have for the resources. In one embodiment, the "ACL" property name has a default value of 0*. In one embodiment, the "Root_Group" property name has a default value of false.

In one embodiment, each API key has one Root_Group that has default permissions to create, delete, view, and modify other ACL Groups ("groups"). In one embodiment, each of the other groups is created for each API key, initially with a designated administrator for a specific application (e.g., customer's application). In one embodiment, the Root_Group cannot be deleted, has at least one user, and will always have at minimum the rights to manage the other groups (e.g., other ACL Groups). In one embodiment, any number of members or resources can be added to the Root_Group and members of the Root_Group have the capability to create groups. Once these groups are properly configured, they could access additional user data. Therefore, the selection of members that are added to the Root_Group is accomplished using a predetermined selection process. In addition, non-root groups can be created and deleted and include any ACL value, members, and resources.

In one embodiment, the "members" property name or field of the ACL Group 300 includes a list of users that share the permissions of the group. Members can be added and removed individually. In one embodiment, the ACL Group 300 supports a wildcard entry ("*") that denotes all users. In one embodiment, the "resources" property name or field of the ACL Group 300 also supports the wildcard entry. The combination of the wildcard entry or explicit member lists, and the wildcard entry or explicit resource lists, gives an API client of the ACL Groups 300 flexibility in defining access rights for users to the patient biometric data (or sensor data source data).

In one embodiment, the wildcard entry for the members field allows ALL potential users the access rights specified in the ACL value to the resources governed by the ACL group. The wildcard entry for the resources field allows members the access rights specified in the ACL value to all resources. The combination of specific or wildcard members and specific or wildcard resources allows the system administrator the ability to provide very rich and variegated access to resources controlled by the ACL system. For example, if you wanted a certain patient's vital signs to be readable by everyone, you could create an ACL group with value=READ, resources=<specific patient GUID> and members=*.

In one embodiment, the "ACL value" property name or field is a bit-field that supports multiple enabled bits per group. In one embodiment, the bit definitions of the ACL values include but are not limited to the fields, integer values, and descriptions listed in Table 1 below. One of ordinary skill in the art readily recognizes that the bit definitions can have varying fields, integer values, and descriptions and that would be within the spirit and scope of the present invention.

TABLE 1

| Field | Integer Value | Description |
|---|---|---|
| ACL_SDS_READ_CURRENT_DATA | 0x0001 | The holder of this permission can read a sensor data source's current (real-time) data |
| ACL_SDS_READ_HISTORICAL_DATA | 0x0002 | The holder of this permission can read a sensor data source's historical data |
| ACL_SDS_RECEIVE_NOTIFICATIONS | 0x0004 | The holder of this permission can receive notifications for this sensor data source |
| ACL_SDS_RESERVED | 0x0008 | Reserved |
| ACL_SDS_CREATE | 0x0010 | The holder of this permission can create a new sensor data source |
| ACL_SDS_VIEW | 0x0020 | The holder of this permission can view a sensor data source |
| ACL_SDS_MODIFY | 0x0040 | The holder of this permission can modify a sensor data source's demographic data, notifications, and other attributes of the sensor data source |
| ACL_SDS_DELETE | 0x0080 | The holder of this permission can delete a sensor data source |
| ACL_GROUP_300_CREATE | 0x0100 | The holder of this permission can create a new ACL group |
| ACL_GROUP_300_VIEW | 0x0200 | The holder of this permission can view ACL group details |

TABLE 1-continued

| Field | Integer Value | Description |
| --- | --- | --- |
| ACL_GROUP_300_MODIFY | 0x0400 | The holder of this permission can modify ACL groups |
| ACL_GROUP_300_DELETE | 0x0800 | The holder of this permission can delete ACL groups |
| ACL_NAMESPACE_CREATE | 0x1000 | The holder of this permission can create a new namespace |
| ACL_NAMESPACE_VIEW | 0x2000 | The holder of this permission can view existing namespaces |
| ACL_NAMESPACE_MODIFY | 0x4000 | The holder of this permission can modify existing namespaces |
| ACL_NAMESPACE_DELETE | 0x8000 | The holder of this permission can delete an existing namespace |

Once the web services client has been authenticated to communicate with the web services server (e.g., in accordance with the authentication process of FIG. 3), it can request a Secure WebSocket for authorization to a specific set of biometric data from a specific patient/user or a group of patients/users. Prior to requesting the Secure WebSocket, the web services client sets up an ACL Group 300 or set of ACL Groups that allow or authorize access to the specific patient biometric data of each of the specific set of patients (e.g., one biometric data stream from one patient or a plurality of biometric data streams from a plurality of patients) being requested by the web services client. The web services server checks that each and every biometric data stream requested by the web services client is authorized by at least one ACL Group.

In one embodiment, the client is not allowed to set up an ACL group unless they are explicitly given this permission by the system administrator, who is a member of the root group. The root group members are by default the only entities in the system who are allowed to create new ACL groups. The system administrator can create a group that allows a user to create other groups, in which case that given user now has system administrator-level privileges.

In one embodiment, if any of the biometric data streams is not authorized, the request for a Secure WebSocket will fail and the web services client will be prompted to contact a user/administrator to have the proper ACL Groups setup. If and only if all of the biometric data streams are authorized by at least one ACL Group, then the web services client request will succeed, the Secure WebSocket will be created, and the web services client with be authorized to access the biometric data streams associated with the at least one ACL Group that are stored on the web services server. Once the request is successful, the web services server creates or otherwise returns a WebSocket URL to the web services client completing the authorization process or the third layer of the security in the system 200.

Figure 4:
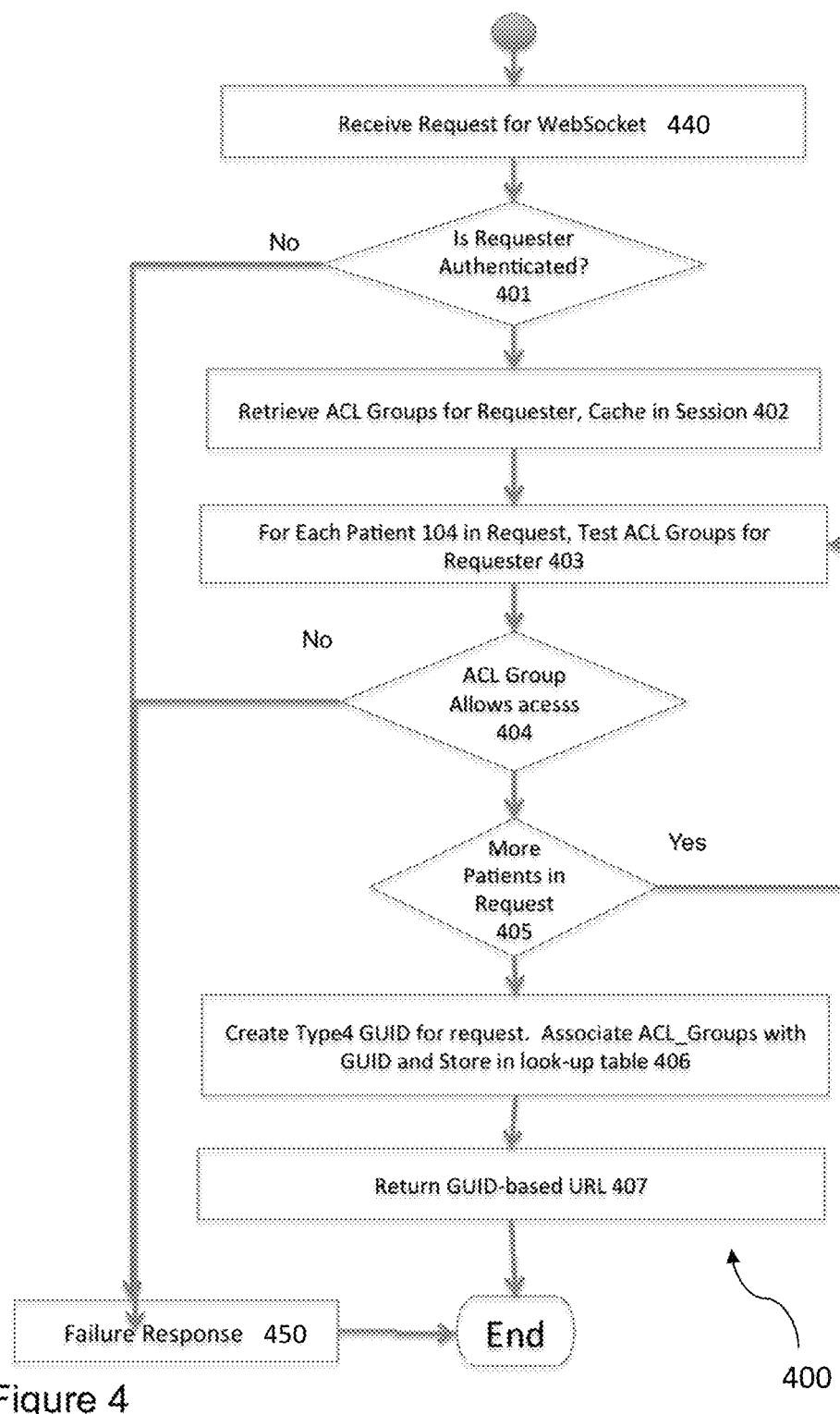
FIG. 4 illustrates a method for authorization of a web services client in accordance with an embodiment.

FIG. 4 illustrates a method 400 for authorization of a web services client in accordance with an embodiment. The method 400 is utilized by the web services server and comprises receiving a request from a web services client for creation of a Secure WebSocket, via step 440, and determining whether the web services client (requester) is authenticated, via step 401. If the requester is not authenticated (e.g., via the authentication process of method 300), then a failure response is generated and transmitted to the requester, via step 450. If the requester is authenticated, the method 400 retrieves the ACL Groups associated with the requester and a cache is in session, via step 402. In one embodiment, all of the ACL Groups associated with the requester are retrieved and in another embodiment, a subset of the ACL Groups associated with the requester are retrieved based upon various characteristics including but not limited to a status of the ACL Group and a last access date.

For each patient/user and their respective biometric data stream that is associated with the request, the method 400 tests the retrieved ACL Groups associated with the requester, via step 403, and determines whether the retrieved ACL Groups authorize access to the specific biometric data stream of that patient, via step 404. The request can include any of a specific set of biometric data associated with only one patient, all of the biometric data associated with only one patient, a specific set of biometric data associated with a plurality of patients, and all of the biometric data associated with a plurality of patients.

If the ACL groups do not allow access, then a failure response is generated and transmitted to the requester, via step 450. If the ACL Groups do allow access, then the method 400 determines whether there are additional patients and their respective biometric data streams associated with the request, via step 405. If yes (there are more patients in the request), then the method 400 returns to step 403 to test the retrieved ACL Groups associated with the requester for the each additional patient.

Once all of the patients in the request have been tested and the web services client has been allowed access to all of the patients, the method 400 creates a GUID for the request, associates each retrieved ACL Group with the created GUID, and stores the created GUID in a look-up table stored on the web services server, via step 406. In one embodiment, the created GUID is a Type4 GUID. After the GUID is created, the method 400 returns a GUID-based URL to the web services client completing the authorization process, via step 407.

In one embodiment, step 407 of the method 400 creates an obfuscated URL to represent the biometric data stream and patient combination. This provides an additional layer of privacy and security by masking the patient identification information and the data content of the associated biometric data streams. It also protects against a brute-force-guess of the stream URL that is created.

In one embodiment, a Type4 GUID is utilized as the path component of the URL. A Type4 GUID is a randomly-generated 128-bit number that is represented as a string (e.g., 12334567-e89b-12d3-a456-426655440000). In one embodiment, the URL associated with the vital sign data stream of one patient or vital sign data group streams of a plurality of patients is represented as the following: wss://web1.corporatename.com/stream/123e4567-e89b-12d3-a456-426655440000. The web services server maintains a look-up table of GUIDs to biometric data streams and combinations thereof to allow subsequent connection by the web services client and the Secure WebSocket that has been returned to the web services client.

The system 200 that utilizes the method 400 allows for requesting one WebSocket for multiple patients which enables a one-to-many relationship between the web services client and the biometric data streams (vital sign data group streams). This is valuable in clinical and medical settings where a medical professional may be monitoring many patients/users (of the wearable device that is detecting the biometric data for each of the patients/users), and would like all of the biometric data associated with all of the patients being monitored to be presented in one place on the web services client (e.g., the client browser that the medical professional is using) or otherwise aggregated to make processing of numerous data streams feasible. This also allows the web services server to optimize performance and scalability by not requesting a one-to-one relationship between the data streams and WebSockets.

Once the WebSocket has been returned to the web services client, the web services client established a new connection to the web services server using the URL provided by the method 400. The web services client presents authentication credentials (e.g., according to FIG. 3) associated with the new connection. The authentication credentials can be provided to a different component within the web services server that is capable of supporting various WebSocket connection types.

Figure 5:
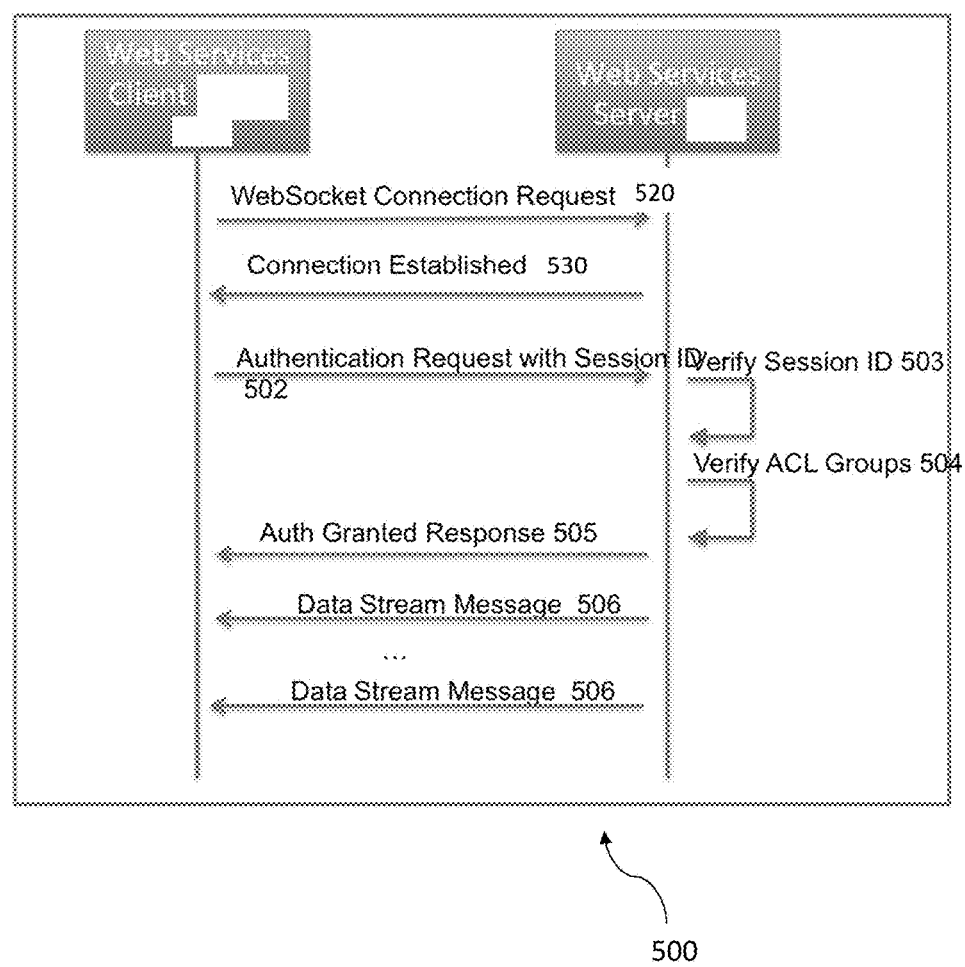
FIG. 5 illustrates a method for secondary authentication and authorization in accordance with an embodiment.

FIG. 5 illustrates a method 500 for secondary authentication and authorization in accordance with an embodiment. The method 500 provides a streamlined authentication and authorization process between the web services client and the web services server after an initial authentication and authorization process has been completed. The initial authentication and authorization process comprises the web services server receiving a WebSocket connection request from an authenticated web services client, via step 520, and establishing the WebSocket connection, via step 530.

Once the Secure WebSocket connection has been established via step 530, the web services client can subsequently request access to the data streams stored on the web services server using an authentication request that includes the Session ID associated with and generated from the steps 520-530, via step 502. The web services server verifies the received Session ID, via step 503, and verifies the ACL Groups associated with the requested data streams to ensure that the web services client has proper authorization, via step 504.

Once both the Session ID and ACL Groups are verified, the web services server transmits an authorization granted response to the web services client, via step 505. Once the web services client has been re-authenticated and re-authorized via steps 502-505, the web services server transmits the data stream message(s) associated with the request by the web services client. In one embodiment, the steps 520-530 occur on the original HTTPS connection between the web services client and the web services server, while the steps 502, 505, and 506 occur within the subsequent WebSocket connection between the web services client and the web services server.

Figure 6:
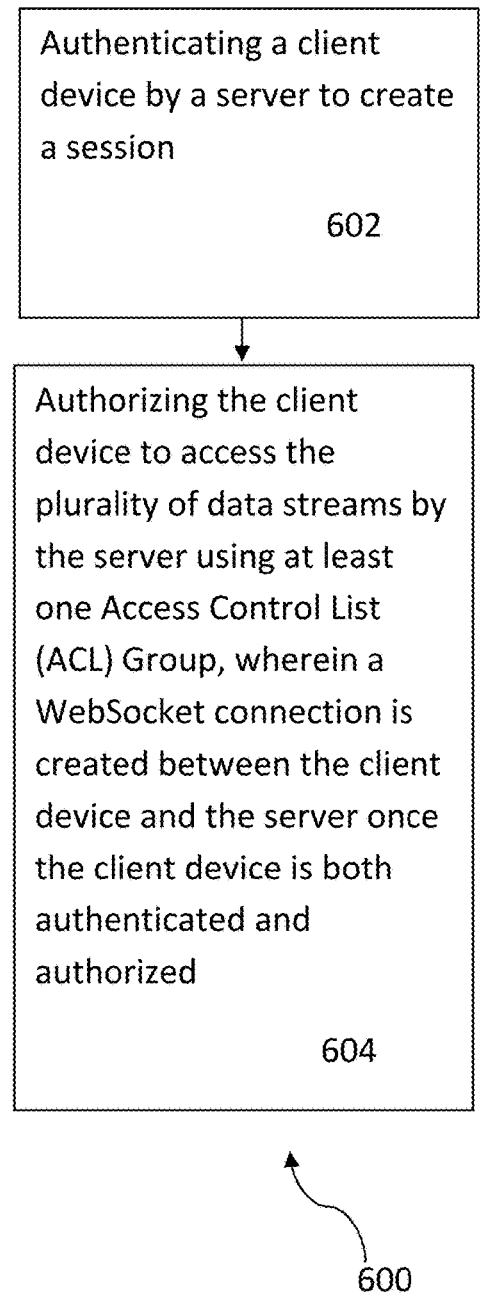
FIG. 6 illustrates a method for securely transmitting a plurality of data streams between a client device and a server in accordance with an embodiment.

FIG. 6 illustrates a method 600 for securely transmitting a plurality of data streams between a client device and a server in accordance with an embodiment. In one embodiment, the client device and the server are in communication with each other via standard Internet protocols (including but not limited to HTTPS, WWS). In another embodiment, the client device and the server are in closer proximity and so are in communication with each other via standard close-range communication protocols including but not limited to Bluetooth. The method 600 comprises authenticating a client device by a server to create a session, via step 602, and authorizing the client device to access the plurality of data streams by the server using at least one Access Control List (ACL) Group, via step 604, wherein a WebSocket connection is created between the client device and the server once the client device is both authenticated and authorized.

In one embodiment, the method includes detecting the plurality of data streams using a wearable device that is attached to a user (or patient that is being monitored using the wearable device), transmitting the plurality of data streams to the server for storage and analysis, and transmitting the plurality of data streams to the client device via the WebSocket connection only when the client device has been previously both authenticated and authorized by the server. In one embodiment, the WebSocket connection includes a unique URL that is based on the plurality of data streams that the client device is requesting access and authorization to. In one embodiment, the unique URL includes a path component that comprises a Type4 Globally Unique Identifier (GUID).

In one embodiment, the method includes maintaining, by the server, a look-up table of a plurality of GUIDs that are each associated with a specific data stream request by each client device. In one embodiment, the client device is any of a web services client server and a web services client browser. In one embodiment, the plurality of data streams comprises a group stream that includes a plurality of individual vital sign data streams. In another embodiment, the plurality of data streams comprise a single individual vital sign data stream from a plurality of different users/patients.

In one embodiment, the session includes a Session ID and identity information (e.g, name, weight, height, address, etc.) that is used on subsequent authentication requests by the client device. In one embodiment, the server authenticates the client device by utilizing any of HTTP basic authentication, HTTP digest authentication, OpenID authentication, and OAuth authentication. In one embodiment, the sever authenticates the client device by receiving an authentication request from the client device, wherein the authentication request includes a username and password, authenticating the username and password, creating and storing a Session ID associated with the session, and transmitting the Session ID to the client device.

In one embodiment, the method includes creating, by the client device, the at least one ACL Group, wherein the at least one ACL Group includes a member list with a client ID of the client device, a permission description, and a resource name associated with the permission description. In one embodiment, the server authorizes the client device by receiving a WebSocket request from the client device and checking whether each of the plurality of data streams associated with the WebSocket request is authorized by the at least one ACL Group.

In one embodiment, a system for securely transmitting a plurality of data streams comprises a client device and a server that is in communication with the client device via standard Internet protocols. In one embodiment, the client device and server each include a processor and a memory device coupled to the processor, wherein the memory device includes an application, which when executed by the processor, causes the processor to carry out the aforementioned steps of the method 600. The server authenticates the client device to create a session and authorizes the client device to access the plurality of data streams using at least one Access Control List (ACL) Group, wherein a WebSocket connection is created by the server once the client device is both authenticated and authorized. The system also carries out the additional aforementioned embodiments of the method 600.

As above described, a method and system in accordance with the present invention utilizes a plurality of security and access layers to securely transmit biometric patient data (and associated data streams) between a client device and a server device that receives and stores the biometric patient data from a plurality of wearable devices that are attached to a plurality of users/patients. The wearable device (e.g., Health Patch® patch sensor) automatically detects physiological data associated with the user/patient of the wearable device. The plurality of security and access layers utilize, as the basis of the secure connection, an HTTP WebSocket connection and an associated uniquely created URL to push data from the server to a client (receiver).

The method and system in accordance with the present invention has the advantage of allowing multiple streams of vital sign data (associated with a plurality of patients/users) to be sent, by the server device, to an authenticated and authorized receiver (or client device) via a single secured network connection. By not requiring a plurality of connections for each of the plurality of data streams that are transmitted between the client and server devices, the method and system in accordance with the present invention achieves a highly optimized, processor efficient, power efficient, and highly scalable system that can handle the secured communications of a large number of wearable devices, data streams, patients, and requesting client devices.

A method and system for securely transmitting vital sign data group streams between a client and a server has been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium (non-transitory). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for securely transmitting a plurality of data streams between a client device and a server that are in communication via standard Internet protocols, the method comprising:
   detecting the plurality of data streams using a wearable device, wherein the wearable device, attached to a user, retrieves a plurality of physiological signals via one or more sensors embedded in the wearable device, and wherein the wearable device utilizes a plurality of algorithms to process raw waveforms of the plurality of physiological signals to form the plurality of data streams;
   transmitting, by the wearable device, the plurality of data streams to the server for storage;
   authenticating, by the server, the client device to create a session;
   authorizing, by the server, the client device to access the plurality of data streams using at least one Access Control List (ACL) Group, wherein the ACL group comprises ACL value supporting multiple enabled bits per group, wherein a WebSocket connection is created by the server once the client device is both authenticated and authorized; and
   transmitting, by the server the plurality of data streams to the client device via the WebSocket connection.

2. The method of claim 1, wherein the WebSocket connection includes a unique URL that is based on the plurality of data streams.

3. The method of claim 2, wherein a path component of the unique URL comprises a Type4 Globally Unique Identifier (GUID).

4. The method of claim 3, further comprising:
   maintaining, by the server, a look-up table of a plurality of GUIDs that are each associated with a specific data stream request by each client device.

5. The method of claim 1, wherein the client device is any of a web services client server and a web services client browser.

6. The method of claim 1, wherein the plurality of data streams comprises a group stream that includes a plurality of individual vital sign data streams.

7. The method of claim 1, wherein the session includes a Session ID and identity information that is used on subsequent authentication requests by the client device.

8. The method of claim 1, wherein the authenticating utilizes any of HTTP basic authentication, HTTP digest authentication, OpenID authentication, and OAuth authentication.

9. The method of claim 1, wherein the authenticating further comprises:
   receiving, by the server, an authentication request from the client device, wherein the authentication request includes a username and password;
   authenticating, by the server, the username and password;
   creating and storing, by the server, a Session ID associated with the session; and
   transmitting, by the server, the Session ID to the client device.

10. The method of claim 1, further comprising:
    creating, by the client device, the at least one ACL Group, wherein the at least one ACL Group includes a member list with a client ID of the client device, a permission description, and a resource name associated with the permission description.

11. The method of claim 10, wherein the authorizing further comprises:
    receiving, by the server, a WebSocket request from the client device; and
    checking, by the server, whether each of the plurality of data streams associated with the WebSocket request is authorized by the at least one ACL Group.

12. A system for securely transmitting a plurality of data streams, the system comprising:

a client device;
a server; and
a wearable device attached to a user to detect a plurality of data streams,
  wherein the wearable device is configured to:
    communicate with the server via standard Internet protocols,
    retrieve a plurality of physiological signals via one or more sensors embedded in the wearable device,
    utilize a plurality of algorithms to process raw waveforms of the plurality of physiological signals to form the plurality of data streams, and
    transmit the plurality of data streams to the server for storage; and
  wherein the server is configured to:
    communicate with the client device via standard Internet protocols,
    authenticate the client device to create a session,
    authorize the client device to access the plurality of data streams using at least one Access Control List (ACL) Group,
  wherein the ACL group comprises ACL value supporting multiple enabled bits per group,
    create a WebSocket connection once the client device is both authenticated and authorized, and
    transmit the plurality of data streams to the client device via the WebSocket connection.

13. The system of claim 12, wherein the WebSocket connection includes a unique URL that is based on the plurality of data streams, further wherein a path component of the unique URL comprises a Type4 Globally Unique Identifier (GUID).

14. The system of claim 12, wherein the server includes a look-up table of a plurality of GUIDs that are each associated with a specific data stream request by each client device.

15. The system of claim 12, wherein the plurality of data streams comprises a group stream that includes a plurality of individual vital sign data streams.

16. The system of claim 12, wherein the session includes a Session ID and identity information that is used on subsequent authentication requests by the client device.

17. The system of claim 12, wherein the at least one ACL Group is created by the client device, further wherein the at least one ACL Group includes a member list with a client ID of the client device, a permission description, and a resource name associated with the permission description.

18. The system of claim 17, wherein the server authorizes the client device further comprises the server receiving a WebSocket request from the client device and checking whether each of the plurality of data streams associated with the WebSocket request is authorized by the at least one ACL Group.

* * * * *